US011952253B2

(12) United States Patent
Kuschnerus et al.

(10) Patent No.: US 11,952,253 B2
(45) Date of Patent: Apr. 9, 2024

(54) METHOD FOR OPERATING A FILLING SYSTEM AND FILLING SYSTEM

(71) Applicant: KROHNE Messtechnik GmbH, Duisburg (DE)

(72) Inventors: Dirk Kuschnerus, Krefeld (DE); Sven Walbrecker, Wesel (DE); Hansjörg Mucke, Mönchengladbach (DE); Martin Krawczyk-Becker, Herne (DE)

(*) Notice: Subject to any disclaimer, the term of this patent is extended or adjusted under 35 U.S.C. 154(b) by 0 days.

(21) Appl. No.: 18/068,820

(22) Filed: Dec. 20, 2022

(65) Prior Publication Data

US 2023/0192467 A1 Jun. 22, 2023

(30) Foreign Application Priority Data

Dec. 21, 2021 (DE) ......................... 102021134033.0

(51) Int. Cl.
*B67C 3/28* (2006.01)
*B65B 3/26* (2006.01)

(52) U.S. Cl.
CPC ................ *B67C 3/287* (2013.01); *B65B 3/26* (2013.01); *B67C 3/282* (2013.01); *B67C 3/286* (2013.01); *B67C 3/288* (2013.01)

(58) Field of Classification Search
CPC .. B65B 3/26; B67C 3/28; B67C 3/287; B67C 3/282; B67C 3/286; B67C 3/288
See application file for complete search history.

(56) References Cited

U.S. PATENT DOCUMENTS

| | | | | |
|---|---|---|---|---|
| 7,703,484 | B2 * | 4/2010 | Montavoci | B67C 3/02 141/2 |
| 9,010,387 | B2 * | 4/2015 | Meinzinger | B67C 3/287 141/147 |
| 10,131,527 | B2 * | 11/2018 | Fickert | B67C 3/26 |
| 10,633,238 | B2 * | 4/2020 | Boscaro | B67C 3/244 |
| 2017/0144784 | A1 * | 5/2017 | Illi | G01F 15/005 |
| 2019/0010039 | A1 * | 1/2019 | Clusserath | B67C 3/287 |
| 2019/0185309 | A1 * | 6/2019 | Huber | B65B 3/04 |
| 2020/0346911 | A1 * | 11/2020 | D'Errico | B67C 3/286 |

(Continued)

FOREIGN PATENT DOCUMENTS

| | | | |
|---|---|---|---|
| DE | 102013100702 | A1 | 7/2014 |
| DE | 102005035264 | B4 | 4/2018 |

(Continued)

*Primary Examiner* — Nicolas A Arnett
(74) *Attorney, Agent, or Firm* — Patrick D. Duplessis

(57) ABSTRACT

A method for operating a filling system with first and second filling points is disclosed. The first filling point has a first unit for controlling and monitoring the filling of the first filling point. The second filling point has a second unit for controlling and monitoring the filling of the second filling point. The first and second units are connected via a communication channel. In an operating state, the first filling point switches to diagnostic mode. The first unit reports the diagnostic start to the second unit. The first unit outputs substitute flow rate or level values. The second unit transmits a deviation message to the first unit in the event of a deviation of the current flow or level value from an expected value. After receipt of the deviation message, the first unit interrupts diagnostic mode and switches to normal operation or outputs corrected substitute flow or level values.

10 Claims, 5 Drawing Sheets

(56) References Cited

U.S. PATENT DOCUMENTS

| | | | | |
|---|---|---|---|---|
| 2022/0396463 | A1 * | 12/2022 | Poeschl | B67C 3/007 |
| 2023/0099328 | A1 * | 3/2023 | Kuschnerus | G05D 9/12 |
| | | | | 700/283 |

FOREIGN PATENT DOCUMENTS

| | | | | | |
|---|---|---|---|---|---|
| DE | 10 2021 115 381 | A1 | | 12/2022 | |
| EP | 2460761 | A1 | | 6/2012 | |
| EP | 3378828 | A1 | * | 9/2018 | B67C 3/007 |

* cited by examiner

METHOD FOR OPERATING A FILLING SYSTEM AND FILLING SYSTEM

TECHNICAL FIELD

The invention relates to a method for operating a filling system, wherein the filling system has at least one first filling point and at least one second filling point, wherein the first filling point has at least one first filling valve, at least one first flow or fill level sensor and at least one first control and evaluation unit for controlling and monitoring the filling process of the first filling point, and wherein the second filling point has at least one second filling valve, at least one second flow or fill level sensor and at least one second control and evaluation unit for controlling and monitoring the filling process of the second filling point, wherein a valve curve of the first filling valve is stored in the first control and evaluation unit and wherein a valve curve of the second filling valve is stored in the second control and evaluation unit, and wherein the first control and evaluation unit and the second control and evaluation unit are connected to one another via a communication channel. In addition, the invention relates to a corresponding filling system.

BACKGROUND

A multitude of filling systems are known from the prior art and are used to fill a wide variety of media into containers. For this, filling systems generally have a plurality of filling points, wherein each of the filling points has at least one filling valve for setting the flow opening, a flow or fill level sensor for determining a flow value, a flow rate or a fill level value, and a control and evaluation unit for controlling and monitoring the filling processes of the filling point.

SUMMARY

The present invention is described with reference to at least two filling points, and some aspects according to the invention are described with reference to at least three filling points. However, the invention is readily applicable to filling systems with more than two or three filling points.

Valve curves for the respective filling valves of the filling points are stored in the control and evaluation units of the filling system. A valve curve shows the flow rate or the flow speed in dependence on the valve opening or the degree of opening of the filling valve. A valve curve is recorded under—within reasonable tolerances—constant process conditions. If the process conditions change, for example if the pressure conditions in the filling system change, the valve curve also changes. Accordingly, it makes sense to keep the current valve curves stored in the control and evaluation units as up-to-date as possible. Preferably, the valve curves are stored in the control and evaluation units immediately before the start of the method according to the invention or it is checked whether the process conditions—which are decisive for the valve curve—have changed.

To ensure reliable operation of the filling system, it is necessary to perform diagnostics of the filling points or individual components of the filling points at regular intervals. Common diagnostics are, for example, zero point monitoring, conductivity monitoring or also—when using magnetic-inductive flowmeters—monitoring of the electrode noise of the measuring electrodes.

Some of the necessary diagnostics can only be performed when there is no flow. This includes, for example, zero point monitoring, which checks whether an actual zero flow is also measured as zero flow. A deviating zero point in a single flowmeter may be due to a valve leak, for example, or it may be due to a sensor error.

Other necessary diagnostics can only be performed while the filling system is in operation, since at least some flow must be present for diagnostic mode. For example, for conductivity monitoring, at least a low flow must be present. Conductivity monitoring is used, for example, to detect deposits on the measuring lines, to detect contamination of the medium or to detect a change in the medium composition. Electrode noise monitoring must be performed, for example, during a flow measurement. A deviation from the expected value for the electrode noise at several filling points may indicate, for example, a changed flow profile or contamination of the medium.

A disadvantage of the necessity to perform diagnostics is that performing diagnostics can disrupt filling operations. For one, it may be necessary to stop the filling process if zero flow is required for diagnostics. Also, if the filling process can continue, the diagnostics may disrupt the filling operation. Here, for example, inaccuracies in the filling quantities may occur, or the flow measurement may slow down during the filling operation. It is therefore known from the prior art to perform diagnostics only when the filling system is at a standstill, for example at the same time as maintenance work, or to dispense with diagnostics altogether. The object of the invention is thus to provide a method for operating a filling system and a corresponding filling system with which a diagnostic mode can be carried out reliably during the filling operation.

The object is achieved in the method according to the invention with the disclosed features.

Accordingly, the method according to the invention is initially and essentially characterized in that initially in the operating state of the filling system, i.e. during the filling operation, the first filling point goes into a diagnostic mode. According to the invention, the first control and evaluation unit reports the diagnostic start to the second control and evaluation unit. In addition, the first control and evaluation unit outputs substitute flow rate or substitute fill level values during the diagnostic mode, and a filling process nevertheless takes place at the first filling point during the diagnostic mode.

The second filling point is in "normal" filling operation when the first filling point is in diagnostic mode. According to the invention, it is now further provided that the second control and evaluation unit transmits a deviation message to the first control and evaluation unit in the event of detection of a deviation of the current flow or fill level value from the flow or fill level value expected on the basis of the valve curve.

The first control and evaluation unit receives the deviation message. According to the invention, two alternative variations are now provided. In a first variation, the first control and evaluation unit terminates the diagnostic mode after receiving the deviation message and switches to normal operation. In normal operation, the first filling point can then react to the changed process conditions and adapt the filling process to the changed process conditions.

In a second variation, the first control and evaluation unit outputs corrected substitute flow or substitute fill level values after receiving the deviation message. Accordingly, in the second variation, the diagnostic mode is not interrupted, but corrected substitute flow or substitute fill level values are output, on the basis of which the filling process is continued at the first filling point.

The method according to the invention offers the advantage that a diagnostic mode can take place at the filling point during the filling process. The filling process is therefore not influenced by performing the diagnosis. The output of the substitute fill level or substitute flow rate values is based on the assumption that the process conditions are constant within predetermined tolerances. In the method according to the invention, a change in the process conditions is detected, namely recognized by the second filling point and reported to the first filling point, so that the latter can react to the changing process conditions in order to prevent or at least minimize a disturbance of the filling process.

It is thus possible to carry out diagnostics even during filling operation. Overall, this results in a more precise filling process, since error states determined during the diagnoses performed can be rectified immediately, or error states can be detected by the diagnoses and it is not necessary to wait until the next maintenance interval of the filling system before existing error states can be detected. By carrying out the diagnoses and the filling processes simultaneously, the maintenance times of the filling system can be shortened, since the diagnoses do not also have to be carried out here, as is usual in the prior art.

According to the invention, there are different variations with which the substitute flow or substitute fill level values can be determined or established.

In a first variation, the method according to the invention is characterized in that the substitute flow or substitute level values are determined by the first control and evaluation unit on the basis of the current valve position of the first filling valve and the valve curve stored in the first control and evaluation unit.

In a second variation, the method according to the invention is characterized in that the second control and evaluation unit transmits current flow or fill level values to the first control and evaluation unit and the first control and evaluation unit outputs these values as substitute flow or substitute fill level values. The first control and evaluation unit thus outputs the same flow or fill level values as the second control and evaluation unit. This is particularly useful if the first and the second control and evaluation units are arranged adjacent to each other or at least in indirect proximity to each other, since then the process conditions at both filling points are approximately identical.

In a third variation, the method according to the invention is characterized in that flow or fill level values from at least one past filling cycle are stored in the first control and evaluation unit and that the first control and evaluation unit outputs these stored flow or fill level values as substitute flow or substitute fill level values.

In a fourth variation, the method according to the invention is characterized in that flow or fill level values from at least one past filling cycle are stored in the second control and evaluation unit and that the second control and evaluation unit transmits these stored flow or fill level values to the first control and evaluation unit and the first control and evaluation unit outputs these values as substitute flow or substitute fill level values.

A particularly preferred design of the method according to the invention is used in a filling system which has at least one third filling point, wherein the third filling point has at least one third filling valve, at least one third flow rate or fill level sensor, and at least one third control and evaluation unit for controlling and monitoring the filling process of the third filling point, wherein a valve curve of the third filling valve is stored in the third control and evaluation unit, and wherein the third control and evaluation unit is connected via a communication channel at least to the second control and evaluation unit. The third control and evaluation unit can also be connected to the first control and evaluation unit via a communication channel. All of the communication channels of the filling system may be wireless or wired. All of the control and evaluation units may also be connected to each other via the same communication channel.

According to the invention, the particularly preferred design of the method according to the invention is characterized in that, in the diagnostic mode of the first filling point, the second control and evaluation unit compares its currently measured flow rate or fill level value with the flow rate or fill level value expected on the basis of the valve curve stored in the second control and evaluation unit. Furthermore, the third control and evaluation unit also compares its currently measured flow or fill level value with the flow or fill level value expected on the basis of the valve curve stored in the third control and evaluation unit.

In case of a deviation of the current flow or fill level values from the flow or fill level values expected on the basis of the valve curves at both filling points, the second control and evaluation unit and the third control and evaluation unit determine the measure and/or the direction of the deviations. According to the invention, the measure and/or the direction of the deviations are further compared with each other. The comparison can, for example, be performed by one of the two control and evaluation units, i.e. by the second control and evaluation unit, or by the third control and evaluation unit—for this purpose, the necessary data have been previously transmitted to the corresponding control and evaluation unit. The comparison can also be carried out in both control and evaluation units, i.e. both in the second control and evaluation unit and in the third control and evaluation unit. In case of a similar deviation, the measure and/or the direction of the deviation is/are transmitted to the first control and evaluation unit. Particularly preferably, the control and evaluation unit that also carried out the comparison also transmits the measure and/or the direction u) of the deviation. A similar deviation is present if the deviations are the same within a predetermined tolerance range.

According to the invention, the method is further characterized in that the first control and evaluation unit corrects the valve curve of the first filling valve—in particular corrects it by the measure and/or the direction of the deviation—and that the first control and evaluation unit outputs a corrected substitute flow or substitute fill level value determined with the corrected valve curve. Thus, the first filling point can react to changes in the process conditions without having to interrupt the diagnostic mode.

In the second variation of the method according to the invention, i.e. in the variation in which the first control and evaluation unit does not stop the diagnostic mode but outputs corrected substitute flow or substitute fill level values, one design provides that both the substitute flow or substitute fill level values and the corrected substitute flow or substitute fill level values are determined using the same method, i.e. are determined in the same way. Alternatively, it is provided that the substitute flow or substitute fill level values and the corrected substitute flow or substitute fill level values are determined by different methods.

During the diagnostic mode, the first control and evaluation unit can perform various diagnostics. If the first control and evaluation unit determines that a error state is present during the diagnostic mode, further variations of the method according to the invention provide for further method steps.

In a very particularly preferred design of the method according to the invention, the first control and evaluation unit sends an inquiry about a diagnostic result of a similar diagnosis to the second control and evaluation unit and/or—if present—to the third control and evaluation unit after determining an error state. Thus, for example, if the first filling point carries out zero point monitoring and detects a deviating zero point, the control and evaluation unit requests the result of a zero point monitoring carried out there from the second and/or third control and evaluation unit. According to the invention, the second control and evaluation unit and/or the third control and evaluation unit further transmits—if available—its diagnostic result for the similar diagnosis to the first control and evaluation unit.

The method according to the invention is further characterized in that the diagnostic result of the first control and evaluation unit is compared with the diagnostic result of the second control and evaluation unit and/or—if present—the third control and evaluation unit. Preferably, the first control and evaluation unit performs the comparison of the diagnostic results.

The method according to the invention is now further characterized in that, in the case of an identical diagnostic result, a process error of the filling system is concluded and, in the case of a different diagnostic result, a filling point error of the first filling point is concluded.

In an alternative variation, the first control and evaluation unit, after determining an error state, transmits the diagnostic result giving rise to the error state to the second control and evaluation unit and/or the third control and evaluation unit—if present.

The method according to the invention is further characterized in that the diagnostic result of the first control and evaluation unit is compared with the diagnostic result of the second control and evaluation unit and/or—if present—the third control and evaluation unit. Preferably, the second control and evaluation unit performs the comparison of the diagnostic results or, if present, the third control and evaluation unit performs the comparison of the diagnostic results. Further preferably, if three control and evaluation units are present, both the second and the third control and evaluation units perform the comparison of the diagnostic results. In a particularly preferred variation, all similar diagnostic results from all control and evaluation units are compared with each other, i.e. the diagnostic results of the first, second and third control and evaluation units.

The method according to the invention in an alternative variation is now also further characterized in that in the case of an identical diagnostic result, a process error of the filling system is concluded and in the case of a different diagnostic result, a filling point error of the first filling point is concluded.

The two variations described have the advantage of providing a particularly elegant way of distinguishing between a filling point error and a process error. The method is based on the assumption that a process error affects the filling points in the same way. If a filling point error is concluded according to the method of the invention, the filling point concerned can, for example, be taken out of commission and serviced. If, on the other hand, a process error is detected, the filling system can be stopped, for example.

In addition to the method for operating a filling system, the invention also relates to a filling system for filling media into containers. The filling system has at least one first filling point and at least one second filling point, wherein the first filling point has at least one first filling valve, at least one first flow or fill level sensor and at least one first control and evaluation unit for controlling and monitoring the filling process of the first filling point, and wherein the second filling point has at least one second filling valve, at least one second flow or fill level sensor and at least one second control and evaluation unit for controlling and monitoring the filling process of the second filling point, wherein a valve curve of the first filling valve is stored in the first control and evaluation unit and wherein a valve curve of the second filling valve is stored in the second control and evaluation unit, and wherein the first control and evaluation unit and the second control and evaluation unit are connected to one another via a communication channel.

In the filling system according to the invention, the object is initially and essentially achieved, namely with the disclosed features, in that the first control and evaluation unit is designed in such a way that, after transition to a diagnostic mode, it reports the diagnostic start to the second control and evaluation unit, that the first control and evaluation unit is further designed in such a way that, during the diagnostic mode, it outputs substitute flow or substitute fill level values, that the second control and evaluation unit is designed in such a way that it transmits a deviation message to the first control and evaluation unit in the event of detection of a deviation of the current flow or fill level value from the flow or fill level value expected on the basis of the valve curve, and that the first control and evaluation unit is further designed in such a way that, after receiving the deviation message, it either interrupts the diagnostic mode and switches to normal operation or outputs corrected substitute flow or substitute fill level values.

In a further preferred variation of the filling system according to the invention, the filling system has at least one third filling point, wherein the third filling point has at least one third filling valve, at least one third flow rate or fill level sensor, and at least one third control and evaluation unit for controlling and monitoring the filling process of the third filling point, wherein a valve curve of the third filling valve is stored in the third control and evaluation unit, and wherein the third control and evaluation unit is connected via a communication channel at least to the second control and evaluation unit. The filling system according to the invention is then further characterized in that the second control and evaluation unit and the third control and evaluation unit are designed in such a way that, in diagnostic mode of the first filling point, the second control and evaluation unit compares its currently measured flow or fill level value with the flow or fill level value expected on the basis of the valve curve stored in the second control and evaluation unit, that the third control and evaluation unit compares its currently measured flow or fill level value with the flow or fill level value expected on the basis of the valve curve stored in the third control and evaluation unit, that in the event of a deviation of the current flow or fill level values from the flow or fill level values expected on the basis of the valve curves, the second control and evaluation unit and the third control and evaluation unit determine the measure and/or the direction of the deviations and compare them with one another, and in the event of a similar deviation, the second control and evaluation unit and/or the third control and evaluation unit transmit or communicate the measure and/or the direction of the deviation to the first control and evaluation unit, that the first control and evaluation unit corrects the valve curve of the first filling valve—in particular corrects it by the measure and/or the direction of the deviation—and that the first control and evaluation unit outputs a corrected substitute flow or substitute fill level value determined with the corrected valve curve.

Particularly preferred designs of the filling system according to the invention are characterized in that the first control and evaluation unit, the second control and evaluation unit and—if provided—the third control and evaluation unit are further designed in such a way that one or more of the variations of the method according to the invention described above can be carried out.

All the variations described in connection with the method according to the invention, with their corresponding advantages, can be transferred analogously to the filling system according to the invention and apply accordingly to the latter.

BRIEF DESCRIPTION OF THE DRAWINGS

In detail, there are now a plurality of possibilities for designing and further developing the method for operating a filling system according to the invention as well as the filling system according to the invention. For this purpose, reference is made to the description of preferred embodiments in conjunction with the drawings.

DETAILED DESCRIPTION

Figure 1:
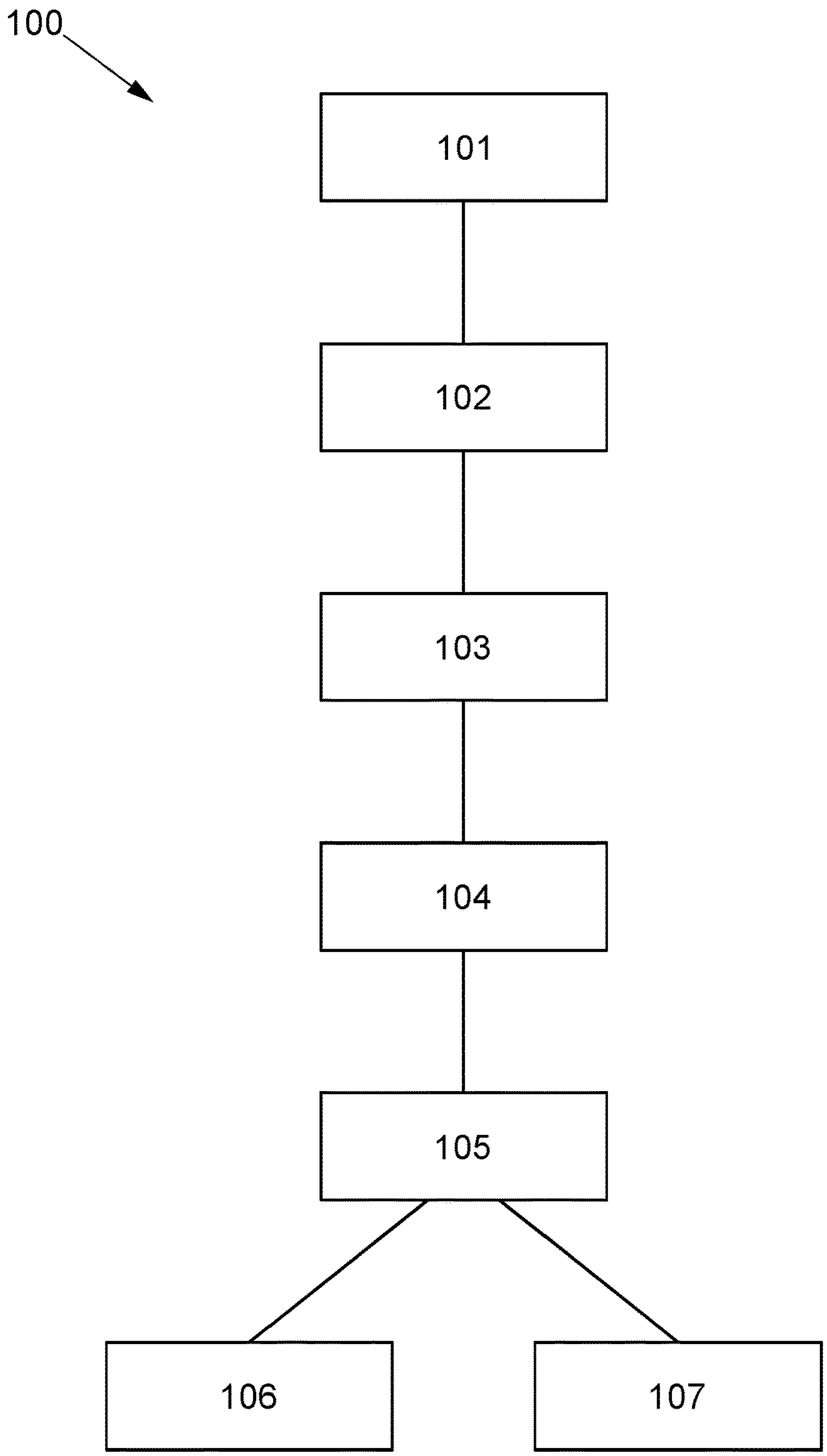
FIG. 1 illustrates a block diagram of a first variation of a method for operating a filling system.
Figure 7:
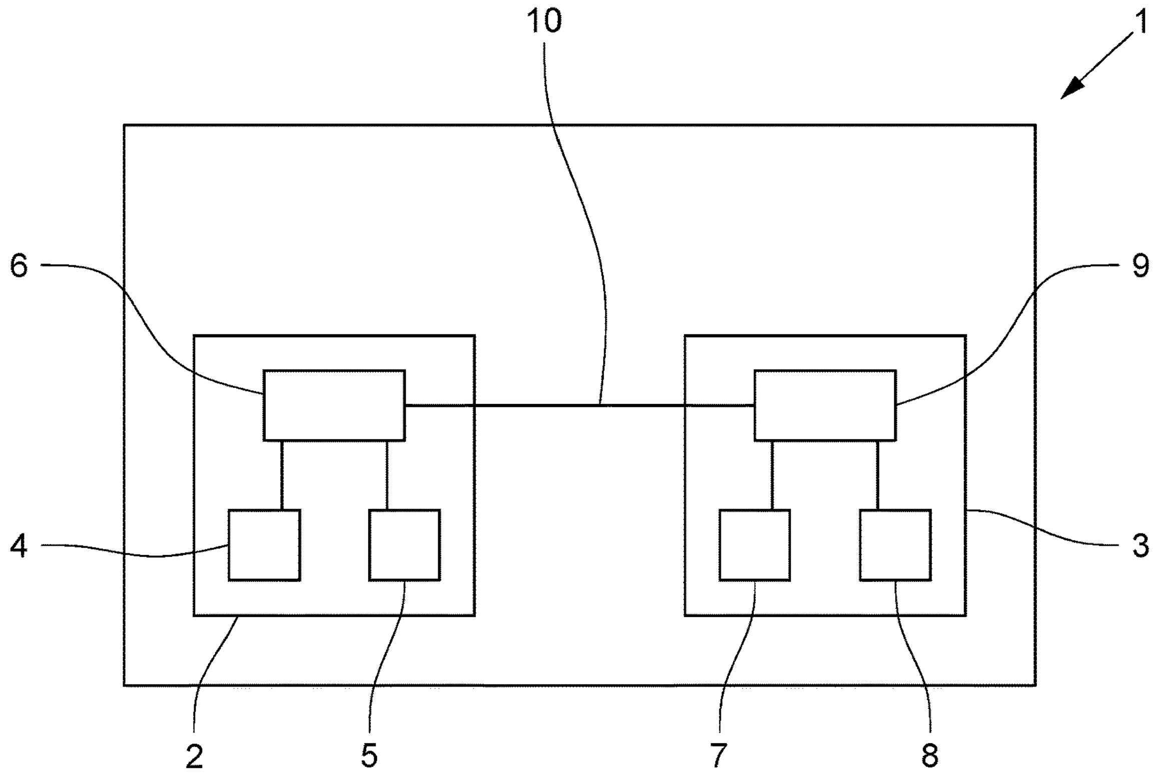
FIG. 7 illustrates a first design of a filling system.

FIG. 1 shows a block diagram of a first variation of a method 100 for operating a filling system 1. A filling system 1 designed to carry out the method 100 shown in FIG. 1 is shown in FIG. 7. The filling system 1 comprises a first filling point 2 and a second filling point 3. The first filling point 2 has a first filling valve 4, a first flow or fill level sensor 5 and a first control and evaluation unit 6. The first control and evaluation unit 6 is designed for controlling and monitoring the filling process of the first filling point 2. The second filling point 3 has a second filling valve 7, a second flow or fill level sensor 8 and a second control and evaluation unit 9, wherein the second control and evaluation unit 9 is designed for controlling and monitoring the filling processes of the second filling point 3. The first control and evaluation unit 6 of the first filling point 2 and the second control and evaluation unit 9 of the second filling point 3 are connected to one another via a communication channel 10.

The method for operating a filling system 1 shown in FIG. 1 is characterized by various method steps. In a first method step 101, the first filling point 2 enters a diagnostic mode during the operating state of the filling system 1. In a second method step 102, the first control and evaluation unit 6 of the first filling point 2 signals the diagnostic start to the second control and evaluation unit 9 of the second filling point 3. The message is transmitted via the communication channel 10. During the diagnostic mode, the first control and evaluation unit 6 outputs substitute flow or substitute fill level values (method step 103). In a further method step 104, the second control and evaluation unit 9 transmits a deviation message to the first control and evaluation unit 6 in the event of detection of a deviation of the current flow or fill level value from the flow or fill level value to be expected on the basis of the valve curve stored in the second control and evaluation unit 9. After receiving 105 the deviation message, the first control and evaluation unit 6 terminates the diagnostic mode in a method step 106 and switches to normal operation. In an alternative variation, the control and evaluation unit 6 outputs corrected substitute flow or substitute level values to the first filling point 2 after receiving 105 the deviation message (method step 107).

The method shown is particularly suitable for carrying out a diagnostic mode of at least one filling point during ongoing filling operation of the filling system. During the diagnostic mode, a filling operation is also carried out at the filling point in diagnostic mode. In addition to the possibility of integrating the diagnostic mode into the filling operation, the method shown also has the advantage that filling at the filling points can be made much more precise, firstly because the filling point in diagnostic mode outputs substitute values for the flow rate or fill level, which are used to check/control the filling, and secondly because any errors which occur can be detected directly in diagnostic mode and thus rectified in a timely manner.

FIGS. 2 to 5 show individual sections of the method shown in FIG. 1 in different variations. Only the method steps between method steps 102 and 103 are shown. All other method steps shown in FIG. 1 are nevertheless carried out before or after the method steps shown in FIGS. 2 to 5.

Figure 2:
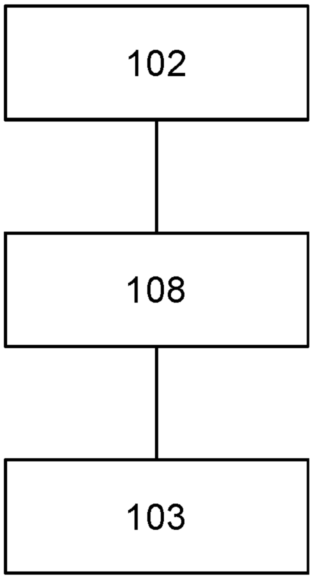
FIG. 2 illustrates a block diagram of a first preferred further development of method steps of the method shown in FIG. 1.

FIG. 2 shows a block diagram of a first, preferred further development of method steps of the method 100 shown in FIG. 1. After signaling the diagnostic start 102 of the first filling point 2 to the second filling point 3, in a method step 108 the first control and evaluation unit 6 of the first filling point 2 determines the substitute flow or substitute fill level values on the basis of the current valve position of the first filling valve 4 and the valve curve stored in the first control and evaluation unit 6. Subsequently, in a method step 103, the substitute values are output by the first control and evaluation unit 6.

Figure 3:
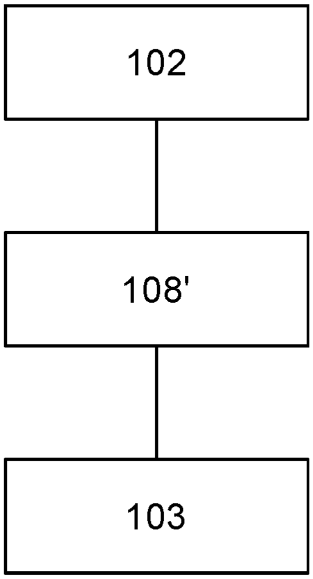
FIG. 3 illustrates a block diagram of a second preferred further development of method steps of the method shown in FIG. 1.

An alternative variation for determining the substitute flow or substitute fill level values is shown in FIG. 3. This differs from the design shown in FIG. 2 in that in a method step 108' the second control and evaluation unit 9 transmits current flow or fill level values to the first control and evaluation unit 6 and the first control and evaluation unit 6 outputs these current flow or fill level values to the second control and evaluation unit 9 as substitute flow or substitute fill level values.

Figure 4:
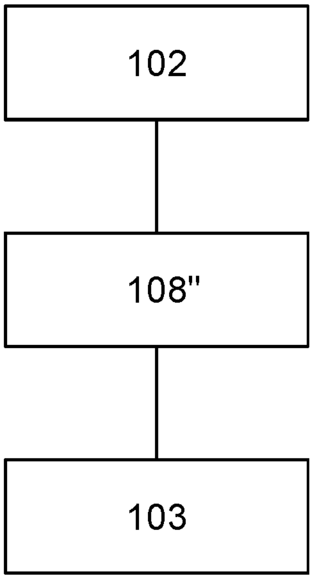
FIG. 4 illustrates a block diagram of a third preferred further development of method steps of the method shown in FIG. 1.

The variation shown in FIG. 4 differs from the previously shown variations in that in a method step 108" the first control and evaluation unit 6 determines the substitute flow or substitute fill level values in such a way that flow or fill level values previously stored in the control and evaluation unit 6 are stored from at least one past filling cycle and these are output as substitute flow or substitute fill level values.

Figure 5:
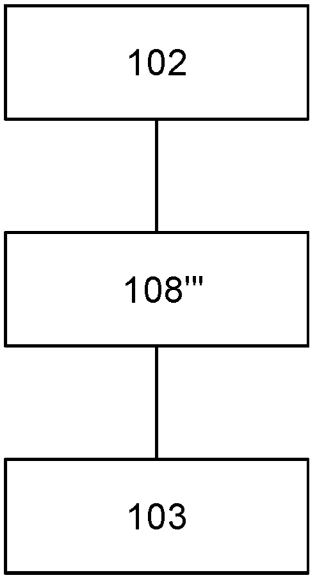
FIG. 5 illustrates a block diagram of a fourth preferred further development of method steps of the method illustrated in FIG. 1.

The variation shown in FIG. 5 is characterized in that in a method step 108'" the second control and evaluation unit 9 transmits flow or fill level values stored in it from a past filling cycle to the first control and evaluation unit 6 of the first filling point 2 and the first control and evaluation unit 6 outputs these values as substitute flow or substitute fill level values.

Figure 6:
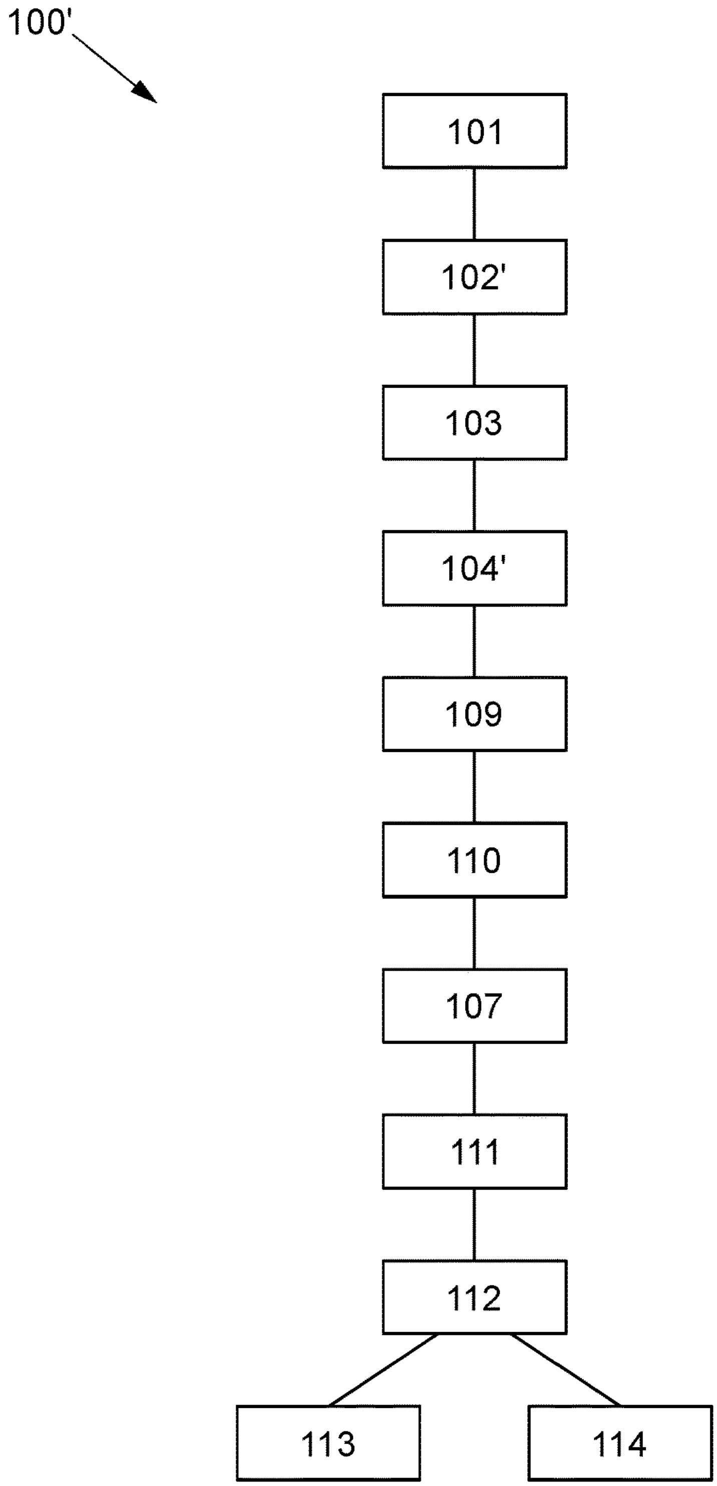
FIG. 6 illustrates a block diagram of a second variation of a method for operating a filling system.
Figure 8:
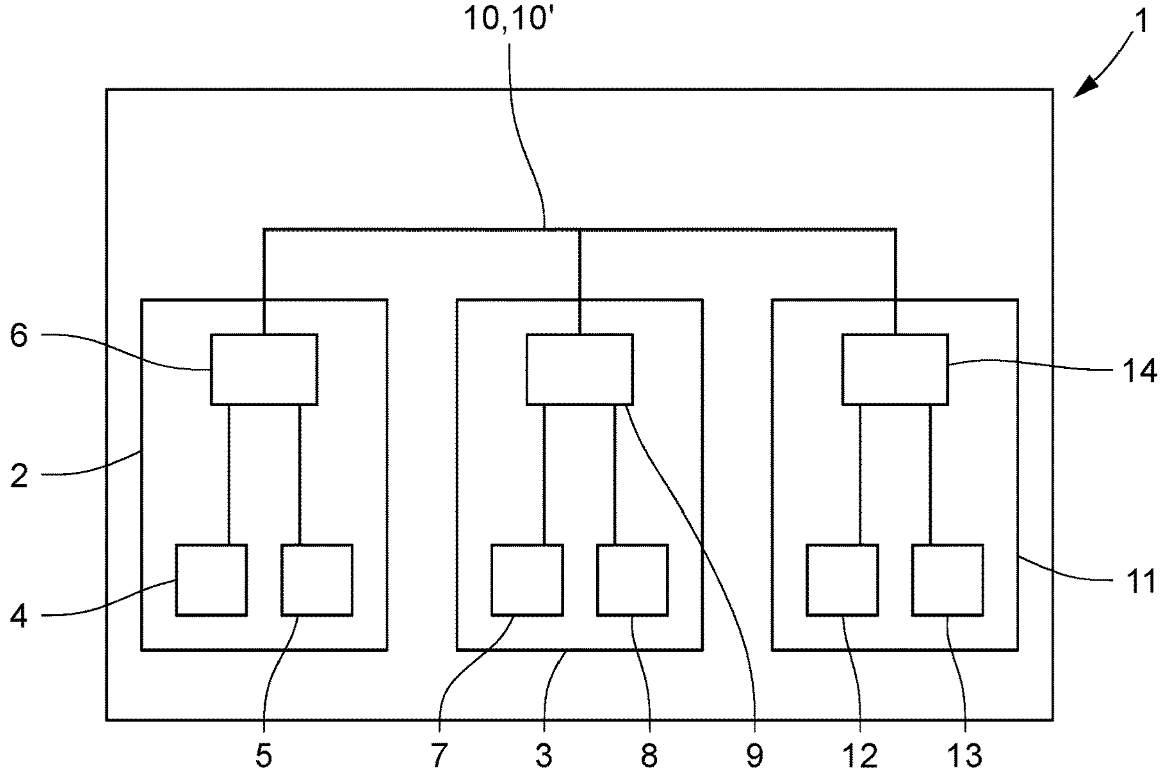
FIG. 8 illustrates a second design of a filling system.

FIG. 6 shows a block diagram of a second method 100' for operating a filling system 1. A corresponding filling system 1, which is particularly suitable for carrying out this method, is shown in FIG. 8. The filling system 1 has a third filling point 11. The third filling point 11 has a third filling valve 12, a third flow or fill level sensor 13 and a third control and evaluation unit 14. The third control and evaluation unit 14 is designed for controlling and monitoring the filling processes of the third filling point 11. The third control and evaluation unit 14 of the third filling point 11 is connected via a communication channel 10' to the second control and evaluation unit 9 of the second filling point 3 and to the first control and evaluation unit 6 of the first filling point 2.

The method 100' shown in FIG. 6 is characterized by the following method steps: In a first method step 101, the first filling point enters a diagnostic mode. In a method step 102', the first filling point 2 signals the diagnostic start to the third filling point 11 via the communication channel 10, 10'. In a method step 103, the first filling point 2 outputs substitute flow or substitute fill level values while the diagnostic mode is in progress. With the substitute flow or substitute fill level values, filling operation is also maintained at the first filling point. In a method step 104', the third control and evaluation unit 14 of the third filling point 11 detects a deviation of a flow or fill level value expected on the basis of the valve curve stored in the third control and evaluation unit from the flow or fill level value actually determined and reports a deviation message to the first control and evaluation unit 6 of the first filling point 2. During the method steps described so far, filling processes are also performed at the second filling point 3. In a method step 109, the second control and evaluation unit 9 and the third control and evaluation unit 14 compare the measure and direction of the deviations of the current flow or fill level values from the flow or fill level values to be expected on the basis of the valve curves stored in the respective control and evaluation units 9, 14 and, in the event of a similar deviation of the measure and/or direction of this deviation, transmit this deviation to the first control and evaluation unit 6. In a method step 110, the first control and evaluation unit 6 performs a correction of the valve curve of the first filling valve 4 stored in the first control and evaluation unit 6. In particular, this correction is performed on the basis of the value transmitted by at least one of the other control and evaluation units 9, 14 for the measure and/or direction of the deviation. In a method step 107, the corrected substitute flow or substitute fill level values determined by means of the corrected valve curve are then output by the first control and evaluation unit 6.

If the first control and evaluation unit 6 detects an error state in diagnostic mode, which is shown by method step 111 in FIG. 6, the first control and evaluation unit 6 makes a request about a diagnostic result of a similar diagnosis to the second control and evaluation unit 9 of the second filling point 3 and/or to the third control and evaluation unit 14 of the third filling point 11. The second control and evaluation unit 9 and/or the third control and evaluation unit 14 transmit or send the requested diagnostic result to the first control and evaluation unit 6 of the first filling point 2. In a method step 112, a comparison of the diagnostic results is performed. In the event of an identical diagnostic result, a method step 113 concludes that the filling system has a process filler and issues the same. In the event of a different diagnostic result, a method step 114 concludes that there is a filling point error at the first filling point 2, and this is output. The method shown in FIG. 6 is therefore also particularly suitable for distinguishing a process error from a fill level error.

The invention claimed is:

1. A method for operating a filling system, wherein the filling system has at least one first filling point and at least one second filling point, wherein the first filling point has at least one first filling valve, at least one first flow or fill level sensor and at least one first control and evaluation unit for controlling and monitoring the filling process of the first filling point, and wherein the second filling point has at least one second filling valve, at least one second flow or fill level sensor and at least one second control and evaluation unit for controlling and monitoring the filling process of the second filling point, wherein a valve curve of the first filling valve is stored in the first control and evaluation unit, and wherein a valve curve of the second filling valve is stored in the second control and evaluation unit, and wherein the first control and evaluation unit and the second control and evaluation unit are connected to one another via a communication channel, the method comprising:

in the operating state of the filling system, switching the first filling point to diagnostic mode;

reporting, by the first control and evaluation unit, the diagnostic start to the second control and evaluation unit;

outputting, by the first control and evaluation unit, substitute flow rate or substitute filling level values during the diagnostic mode;

transmitting, by the second control and evaluation unit, a deviation message to the first control and evaluation unit in the event of detection of a deviation of the current flow or level value from the flow or level value expected on the basis of the valve curve; and after receipt of the deviation message, interrupting diagnostic mode and switching to normal operation, or outputting corrected substitute flow or substitute level values, by the first control and evaluation unit.

2. The method according to claim 1, wherein the substitute flow or substitute filling level values are determined by the first control and evaluation unit on the basis of the current valve position of the first filling valve and the valve curve stored in the first control and evaluation unit.

3. The method according to claim 1, wherein the second control and evaluation unit transmits current flow or fill level values to the first control and evaluation unit and the first control and evaluation unit outputs these current flow or fill level values as substitute flow or substitute fill level values.

4. The method according to claim 1, wherein flow rate or fill level values from at least one past filling cycle are stored in the first control and evaluation unit, and the first control and evaluation unit outputs these stored flow rate or fill level values as substitute flow rate or substitute fill level values; or wherein flow or fill level values from at least one past filling cycle are stored in the second control and evaluation unit, and the second control and evaluation unit transmits these stored flow or fill level values to the first control and evaluation unit and the first control and evaluation unit outputs these flow or fill level values transmitted by the second control and evaluation unit as substitute flow or substitute fill level values.

5. The method according to claim 1, wherein the filling system has at least one third filling point, wherein the third filling point has at least one third filling valve, at least one third flow or fill level sensor, and at least one third control and evaluation unit for controlling and monitoring the filling process of the third filling point, wherein a valve curve of the third filling valve is stored in the third control and evaluation unit, and wherein the third control and evaluation unit is connected via a communication channel at least to the second control and evaluation unit;

wherein, in the diagnostic mode of the first filling point, the second control and evaluation unit compares a currently measured flow or fill level value with the flow or fill level value expected on the basis of the valve curve stored in the second control and evaluation unit;

wherein the third control and evaluation unit compares a currently measured flow or fill level value with the flow or fill level value expected on the basis of the valve curve stored in the third control and evaluation unit;

wherein, in the event of a deviation of the current flow or fill level values from the flow or fill level values expected on the basis of the valve curves, the second control and evaluation unit and the third control and evaluation unit determine and compare with one another the degree and/or the direction of the deviations and, in the event of a similar deviation, the second control and evaluation unit and/or the third control and evaluation unit transmit or communicate the degree and/or the direction of the deviation to the first control and evaluation unit; and wherein the first control and evaluation unit corrects the valve curve of the first filling valve by the measure and/or the direction of the deviation and the first control and evaluation unit outputs a corrected substitute flow rate or substitute filling level value determined with the corrected valve curve.

6. The method according to claim 1, wherein in diagnostic mode, in the event of detection of a error state, the first control and evaluation unit:

transmits an inquiry about a diagnostic result to the second control and evaluation unit and/or—if present—to the third control and evaluation unit, and wherein the second control and evaluation unit and/or the third control and evaluation unit—if present—transmits a diagnostic result to the first control and evaluation unit; and transmits the diagnostic result justifying the error state to the second control and evaluation unit and/or the third control and evaluation unit—if present;

wherein the diagnostic result of the first control and evaluation unit is compared with the diagnostic result of the second control and evaluation unit and/or—if present—the third control and evaluation unit;

wherein in the case of an identical diagnostic result, a process error of the filling system is concluded; and wherein in the case of a different diagnostic result, a filling point error of the first filling point is concluded.

7. A filling system for filling media into containers, comprising:

at least one first filling point; and at least one second filling point;

wherein the first filling point has at least one first filling valve, at least one first flow or fill level sensor and at least one first control and evaluation unit for controlling and monitoring the filling process of the first filling point;

wherein the second filling point has at least one second filling valve;

wherein the first filling point has at least one second flow or fill level sensor and at least one second control and evaluation unit for controlling and monitoring the filling process of the second filling point, at least one second flow or fill level sensor and at least one second control and evaluation unit for controlling and monitoring the filling process of the second filling point;

wherein a valve curve of the first filling valve is stored in the first control and evaluation unit;

wherein a valve curve of the second filling valve is stored in the second control and evaluation unit, and wherein the first control and evaluation unit and the second control and evaluation unit are connected to one another via a communication channel;

wherein the first control and evaluation unit is designed to report the diagnostic start to the second control and evaluation unit after transition to a diagnostic mode;

wherein the first control and evaluation unit is further designed to output substitute flow rate or substitute fill level values during the diagnostic mode;

wherein the second control and evaluation unit is designed to transmit a deviation message to the first control and evaluation unit in the event of detection of a deviation of the current flow or fill level value from the flow or fill level value expected on the basis of the valve curve; and wherein the first control and evaluation unit is further designed in such a way that, after receipt of the deviation message, the first control and evaluation unit interrupts the diagnostic mode and switches to normal operation or outputs corrected substitute flow or substitute level values.

8. The filling system according to claim 7, wherein the filling system has at least one third filling point;

wherein the third filling point has at least one third filling valve, at least one third flow or fill level sensor and at least one third control and evaluation unit for controlling and monitoring the filling process of the third filling point;

wherein a valve curve of the third filling valve is stored in the third control and evaluation unit, and wherein the third control and evaluation unit is connected via a communication channel at least to the second control and evaluation unit;

wherein the second control and evaluation unit and the third control and evaluation unit are designed in such a way that, in the diagnostic mode of the first filling point, the second control and evaluation unit compares a currently measured flow rate or fill level value with the flow rate or fill level value expected on the basis of the valve curve stored in the second control and evaluation unit;

wherein the third control and evaluation unit compares a currently measured flow or fill level value with the flow or fill level value expected on the basis of the valve curve stored in the third control and evaluation unit;

wherein, in the event of a deviation of the current flow or filling level values from the flow or filling level values expected on the basis of the valve curve curves, the second control and evaluation unit and the third control and evaluation unit determine the measure and/or the direction of the deviations and compare them with one another and, in the event of a similar deviation, transmit the measure and/or the direction of the deviation to the first control and evaluation unit; and wherein the first control and evaluation unit is further designed to correct the valve curve of the first filling valve by the measure and/or the direction of the deviation and the first control and evaluation unit is further designed to output a corrected substitute flow rate or substitute fill level value determined with the corrected valve curve.

9. The filling system according to claim 8, wherein the third control and evaluation unit is further designed in such a way that:

in diagnostic mode, in the event of detection of an error state, the first control and evaluation unit transmits an inquiry about a diagnostic result to the second control and evaluation unit and/or to the third control and evaluation unit; and wherein the second control and evaluation unit and/or the third control and evaluation unit transmits a diagnostic result to the first control and evaluation unit, and transmits the diagnostic result justifying the error state to the second control and evaluation unit and/or the third control and evaluation unit;

wherein the diagnostic result of the first control and evaluation unit is compared with the diagnostic result of the second control and evaluation unit and/or the third control and evaluation unit;

wherein in the case of an identical diagnostic result, a process error of the filling system is concluded; and wherein in the case of a different diagnostic result, a filling point error of the first filling point is concluded.

10. The filling system according to claim 7, wherein the first control and evaluation unit, and the second control and evaluation unit are further designed in such a way that at least one of:

the substitute flow or substitute filling level values are determined by the first control and evaluation unit on the basis of the current valve position of the first filling valve and the valve curve stored in the first control and evaluation unit;

the second control and evaluation unit transmits current flow or fill level values to the first control and evaluation unit and the first control and evaluation unit outputs these current flow or fill level values as substitute flow or substitute fill level values;

flow rate or fill level values from at least one past filling cycle are stored in the first control and evaluation unit, and the first control and evaluation unit outputs these stored flow rate or fill level values as substitute flow rate or substitute fill level values, or flow or fill level values from at least one past filling cycle are stored in the second control and evaluation unit, and the second control and evaluation unit transmits these stored flow or fill level values to the first control and evaluation unit and the first control and evaluation unit outputs these flow or fill level values transmitted by the second control and evaluation unit as substitute flow or substitute fill level values; and in diagnostic mode, in the event of detection of a error state, the first control and evaluation unit transmits an inquiry about a diagnostic result to the second control and evaluation unit; and wherein the second control and evaluation unit transmits a diagnostic result to the first control and evaluation unit, and transmits the diagnostic result justifying the error state to the second control and evaluation unit;

wherein the diagnostic result of the first control and evaluation unit is compared with the diagnostic result of the second control and evaluation unit;

wherein in the case of an identical diagnostic result, a process error of the filling system is concluded, and wherein in the case of a different diagnostic result, a filling point error of the first filling point is concluded.

* * * * *